United States Patent
Savard et al.

(10) Patent No.: US 12,115,944 B2
(45) Date of Patent: Oct. 15, 2024

(54) VEHICLE ROOF ACCESSORY ASSEMBLY AND VEHICLE WITH SAME

(71) Applicant: BOMBARDIER RECREATIONAL PRODUCTS INC., Valcourt (CA)

(72) Inventors: Laurent Savard, Granby (CA); Abdelghafour Elbaroudi, Valcourt (CA); Hugo Martin, Knowlton (CA); Patrick Mathieu, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 325 days.

(21) Appl. No.: 17/575,185

(22) Filed: Jan. 13, 2022

(65) Prior Publication Data
US 2022/0242326 A1 Aug. 4, 2022

Related U.S. Application Data

(60) Provisional application No. 63/143,175, filed on Jan. 29, 2021.

(51) Int. Cl.
*B60R 9/058* (2006.01)
(52) U.S. Cl.
CPC ................... *B60R 9/058* (2013.01)
(58) Field of Classification Search
CPC .. B60R 9/058; B60R 9/04; B60R 9/06; B60R 9/00
See application file for complete search history.

(56) References Cited

U.S. PATENT DOCUMENTS

| 4,483,471 | A | * | 11/1984 | Prosen | B60R 9/08 224/325 |
| 5,056,855 | A | * | 10/1991 | Moravsky | B60J 7/104 296/105 |
| 5,292,045 | A | * | 3/1994 | Mandel | B60R 9/00 224/309 |
| 5,904,463 | A | * | 5/1999 | Christensen | B60R 9/00 224/310 |

(Continued)

OTHER PUBLICATIONS offroadarmor.com, Honda Pioneer 1000-5 Crew Ranch Armor Metal Top, retrieved from https://offroadarmor.com/product/honda-pioneer-1000-5-crew-ranch-armor-metal-top/ on Jan. 19, 2021.

*Primary Examiner* — Brian D Nash
(74) *Attorney, Agent, or Firm* — BCF LLP

(57) ABSTRACT

An off-road vehicle and vehicle roof accessory assembly are disclosed. The vehicle includes a frame; a motor connected to the frame; a plurality of ground engaging members operatively connected to the frame, at least one ground engaging member of the plurality of ground engaging members being operatively connected to the motor; a roll cage connected to the frame, the roll cage defining at least in part a cockpit area; two seats connected to the frame, the two seats being disposed side by side in the cockpit area; a cargo box connected to the frame rearward of the two seats; and the vehicle roof accessory structure, including an accessory support structure selectively connected to the cargo box, the accessory support structure being adapted for selectively receiving at least one rooftop accessory for extending over and selectively connecting to the roll cage and the support structure.

13 Claims, 18 Drawing Sheets

(56) References Cited

U.S. PATENT DOCUMENTS

| | | | | |
|---|---|---|---|---|
| 5,924,835 | A * | 7/1999 | Ross | B60P 3/06 296/3 |
| 6,186,571 | B1 * | 2/2001 | Burke | B60R 9/00 296/3 |
| 6,513,849 | B2 * | 2/2003 | Carter | B60P 3/40 224/310 |
| 6,655,722 | B2 * | 12/2003 | Bareket | B60R 9/00 296/3 |
| 6,883,848 | B1 * | 4/2005 | Iverson | B62D 35/001 296/180.1 |
| 7,753,615 | B1 * | 7/2010 | Sprague | B60P 3/40 410/32 |
| 7,757,916 | B1 * | 7/2010 | Petrie | B60R 9/00 224/403 |
| 7,758,091 | B1 * | 7/2010 | McCall | B60P 3/40 296/3 |
| 7,946,457 | B2 * | 5/2011 | Kramer | B60R 9/00 224/325 |
| 8,662,366 | B1 * | 3/2014 | DeZonia | B60R 9/04 224/403 |
| D765,577 | S * | 9/2016 | Kmita | D12/412 |
| 9,796,428 | B1 * | 10/2017 | Tamaddon-Dallal | B60R 9/045 |
| 11,485,425 | B2 * | 11/2022 | Crandall | B60R 9/06 |
| 2003/0168879 | A1 * | 9/2003 | Grudek | B60P 3/40 296/100.15 |
| 2005/0023314 | A1 * | 2/2005 | Williams | B60R 9/00 224/320 |
| 2006/0054648 | A1 * | 3/2006 | Maguire | B60R 9/00 224/457 |
| 2006/0226188 | A1 * | 10/2006 | Smith | B60R 9/04 224/326 |
| 2008/0047993 | A1 * | 2/2008 | Wooten | B60R 9/00 224/325 |
| 2008/0047994 | A1 * | 2/2008 | Beamer | B60R 9/10 224/403 |
| 2011/0079620 | A1 * | 4/2011 | Todorovic | B60R 9/00 29/428 |
| 2015/0123422 | A1 * | 5/2015 | Bennett | B60R 9/04 296/136.1 |
| 2016/0075288 | A1 * | 3/2016 | Peck | B60R 9/10 224/553 |
| 2019/0092248 | A1 * | 3/2019 | Cotton | B60K 15/01 |
| 2019/0308673 | A1 * | 10/2019 | Mar | B62D 33/08 |
| 2021/0171109 | A1 * | 6/2021 | Johnson | B62D 21/183 |
| 2022/0024390 | A1 * | 1/2022 | Johnstun | B60P 7/0807 |
| 2022/0388454 | A1 * | 12/2022 | Wronski | B60R 9/06 |
| 2023/0001858 | A1 * | 1/2023 | Greeno | B60R 9/06 |
| 2023/0242041 | A1 * | 8/2023 | Rousseau | B60R 5/00 296/37.1 |

* cited by examiner

VEHICLE ROOF ACCESSORY ASSEMBLY AND VEHICLE WITH SAME

CROSS-REFERENCE

The present application claims priority to U.S. Provisional Patent Application No. 63/143,175, entitled "Vehicle Roof Accessory Assembly and Vehicles with Same," filed Jan. 29, 2021, the entirety of which is incorporated herein by reference.

FIELD OF TECHNOLOGY

The present technology relates to vehicle roof accessory assemblies and off-road vehicles having a vehicle roof accessory assembly.

BACKGROUND

Off-road vehicles, such as side-by-side off-road vehicles (SSVs) and the like, are used for both utility and recreational purposes. To provide flexibility to such vehicles, accessories, such as solid roofs and roof racks can be selectively connected to such vehicles.

Depending on the size and style of the vehicle, the corresponding accessories generally vary. For example, the roof rack required for a two-seat SSV is a different size than the roof rack required for a four-seat SSV. For manufacturing practicality, however, creation of different accessory kits for different vehicles can be burdensome.

Therefore, there is a desire for vehicle accessories for off-road vehicles that reduce manufacturing complications for different vehicles.

SUMMARY

It is an object of the present technology to ameliorate at least some of the inconveniences present in the prior art.

According to one aspect of the present technology, there is provided a vehicle roof accessory assembly, including a support structure and a roof accessory, specifically a roof and/or a roof rack. The roof and the roof rack are sized and configured to be connectable to a side-by-side vehicle with two rows of seating, as well as to a side-by-side vehicle with one row of seating. In the case of the side-by-side vehicle with one row of seating, the support structure connects to the cargo box of supports rear portions of the roof and/or roof rack. In this way, one style of roof and roof rack can be produced and utilized for both vehicles having one and two rows of seating.

According to one aspect of the present technology, there is provided a vehicle roof accessory assembly, including an accessory support structure adapted for selectively connecting to a cargo box of a side-by-side vehicle; and at least one vehicle roof accessory, the at least one vehicle roof accessory being adapted for selectively connecting to a roll cage of the vehicle and the accessory support structure when connected to the cargo box, the side-by-side vehicle having one row of seating.

In some embodiments, the at least one roof accessory is further adapted for connecting to a roll cage of a side-by-side vehicle having two rows of seating.

In some embodiments, the at least one roof accessory is at least one of: a roof for selectively covering at least a portion of a cockpit area of the vehicle; and a roof rack for selectively extending over at least a portion of the cockpit area.

In some embodiments, the at least one roof accessory includes: the roof; and the roof rack.

In some embodiments, the accessory support structure includes a plurality of rigid members selectively connected together.

In some embodiments, the plurality of rigid members of the accessory support structure are selectively fastened together.

In some embodiments, at least one of the plurality of rigid members includes at least one male connecting portion to be received in at least one other of the plurality of rigid members; the at least one male connecting portion defines a V-shaped notch therein; and further including at least one V-shaped nut disposed in the V-shaped notch.

In some embodiments, the support structure includes a top frame portion; two front members extending generally downward from the top frame portion; two rear members extending generally downward from the top frame portion.

In some embodiments, the accessory assembly further includes two brackets for connecting to the roll cage, each of the two brackets defining a through-hole therethrough for receiving a fastener for connecting the at least one roof accessory thereto.

According to another aspect of the present technology, there is provided an off-road vehicle including a frame; a motor connected to the frame; a plurality of ground engaging members operatively connected to the frame, at least one ground engaging member of the plurality of ground engaging members being operatively connected to the motor; a roll cage connected to the frame, the roll cage defining at least in part a cockpit area; two seats connected to the frame, the two seats being disposed side by side in the cockpit area; a cargo box connected to the frame rearward of the two seats, the cargo box having a floor, a front wall extending upwardly from a front end of the floor, a left side wall extending upwardly from a left side of the floor, a right side wall extending upwardly from a right side of the floor; and an accessory support structure selectively connected to the cargo box, the support structure extending generally upward from the cargo box, the accessory support structure being adapted for selectively receiving at least one rooftop accessory, the at least one rooftop accessory being adapted for extending over and selectively connecting to the roll cage and the support structure.

In some embodiments, the vehicle further includes the at least one rooftop accessory; and the at least one rooftop accessory is selectively connected to the roll cage and the support structure.

In some embodiments, the at least one rooftop accessory is selectively fastened to the roll cage and the support structure.

In some embodiments, the at least one rooftop accessory is selectively connected to: a top portion of the roll cage; and a top portion of the support structure.

In some embodiments, the at least one rooftop accessory is one of: a roof for covering a top side portion of the cockpit area; and a roof rack extending over the top side portion of the cockpit area.

In some embodiments, the at least one rooftop accessory is: a roof selectively fastened to the roll cage and the support structure, the roof being adapted for covering a top side portion of the cockpit area; and a roof rack selectively fastened to the roof.

In some embodiments, the support structure includes a top frame portion; two front members extending generally downward from the top frame portion; two rear members extending generally downward from the top frame portion.

In some embodiments, the support structure further includes at least one bracket connected to at least one of the front members, the at least one bracket being selectively connected to the roll cage.

In some embodiments, the support structure is formed from a plurality of members selectively fastened together by a plurality of fasteners, the plurality of members being separable from one another by removing the plurality of fasteners from the support structure.

For purposes of the present application, terms related to spatial orientation when referring to a vehicle and components in relation to the vehicle, such as "forwardly", "rearwardly", "left", "right", "top", "bottom", "upper", "lower" "above" and "below", are as they would be understood by a driver of the vehicle sitting therein in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

The present technology will be described with reference to a two-seat side-by-side (SSV) off-road vehicle 40 and a four-seat SSV off-road vehicle 200.

Figure 1:
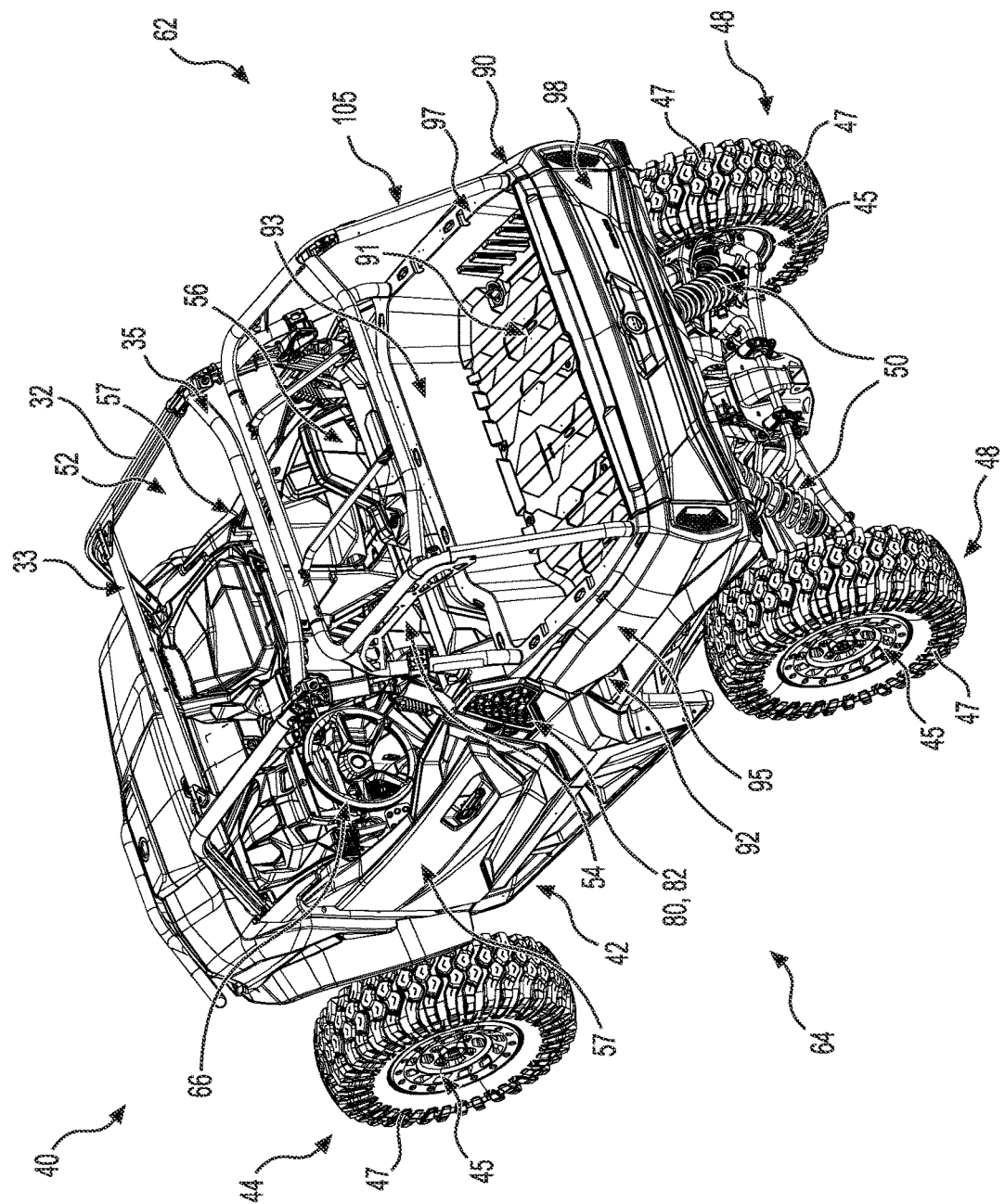
FIG. 1 is a perspective view taken from a top, rear, left side of a two-seat side-by-side vehicle (SSV), with a support structure of an accessory assembly connected thereto.
Figure 2:
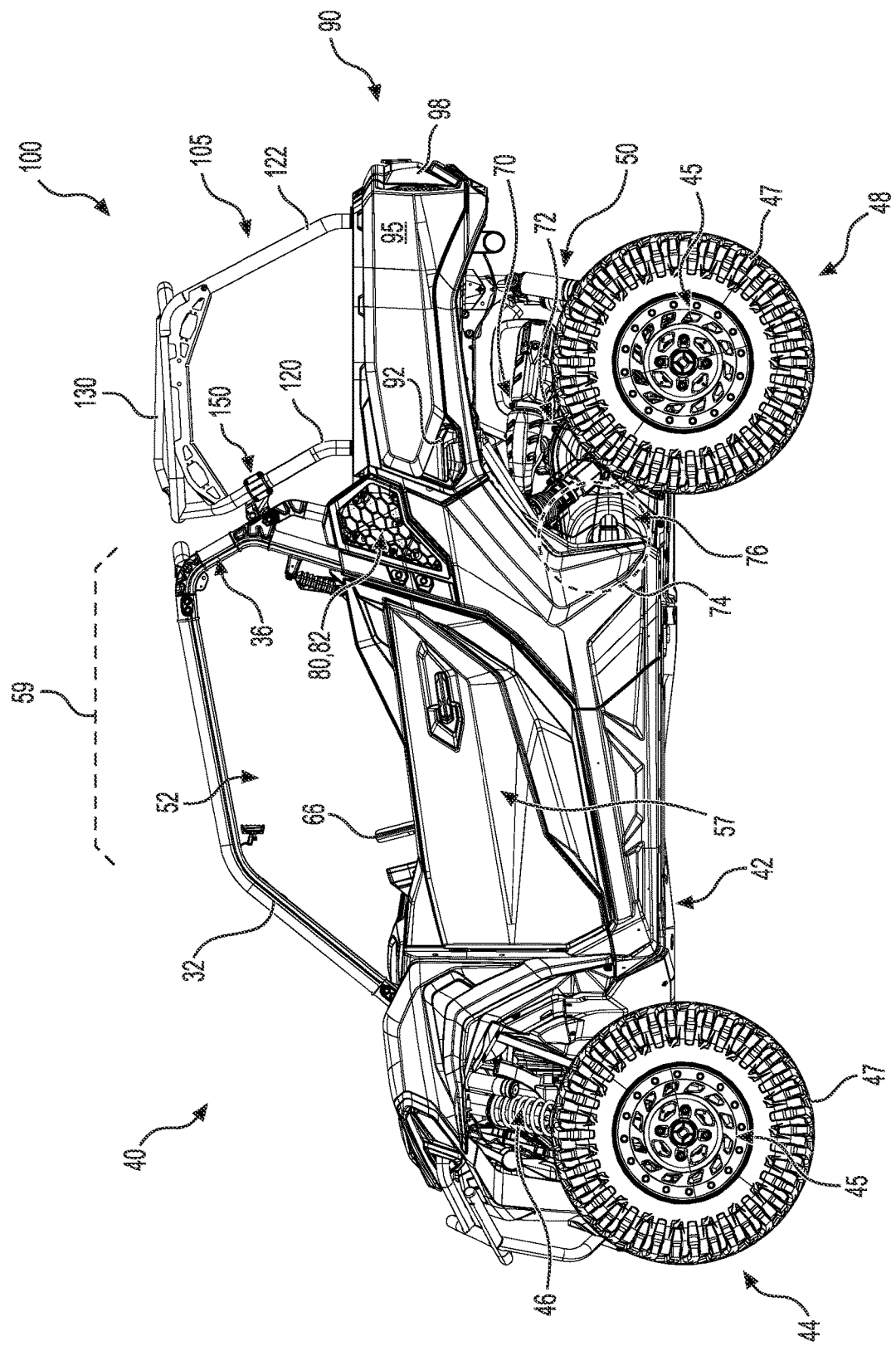
FIG. 2 is a left side elevation view of the vehicle of FIG. 1.
Figure 3:
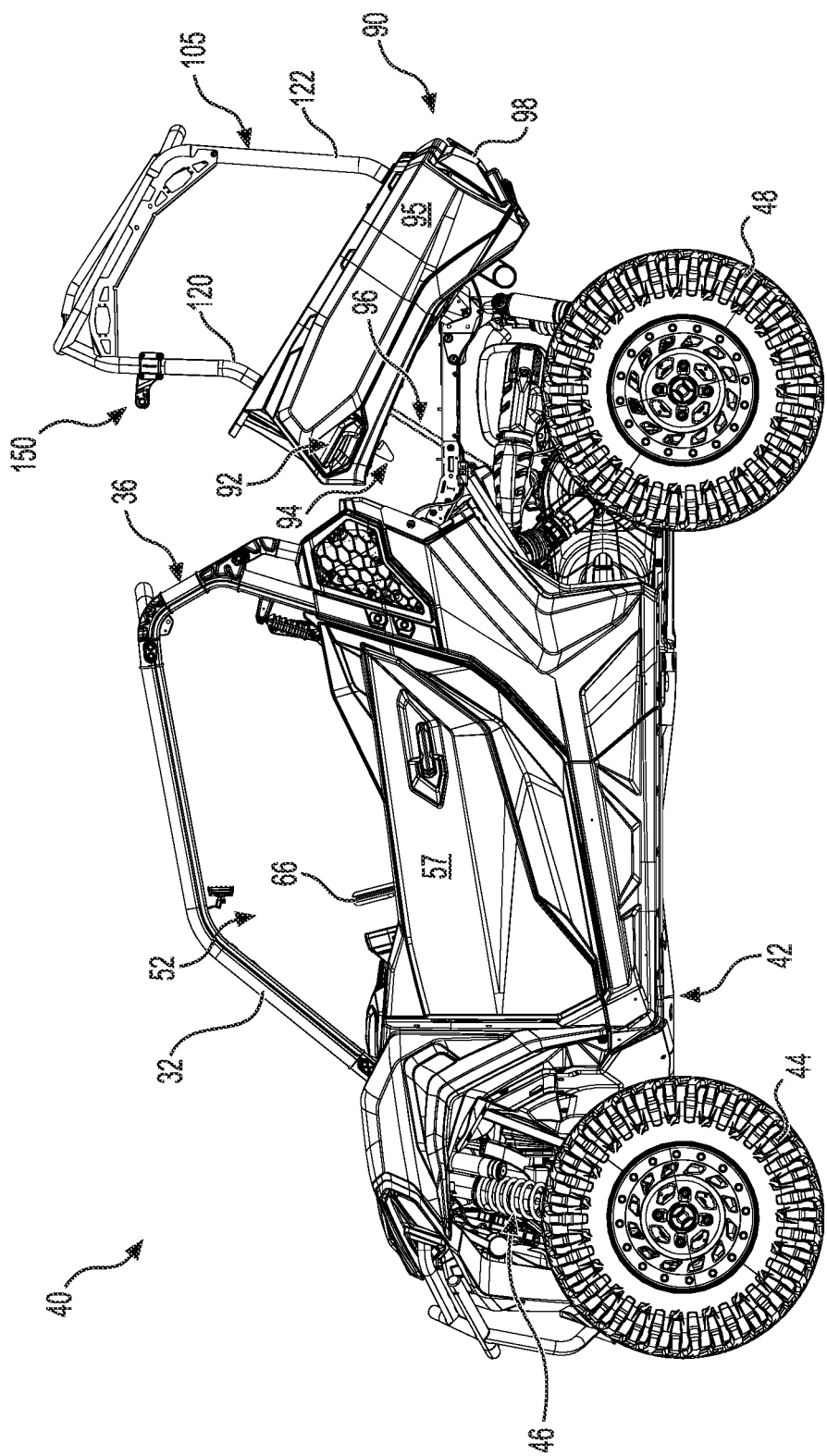
FIG. 3 is the left side elevation view of the vehicle of FIG. 2, with a cargo box in a raised position.
Figure 6A:
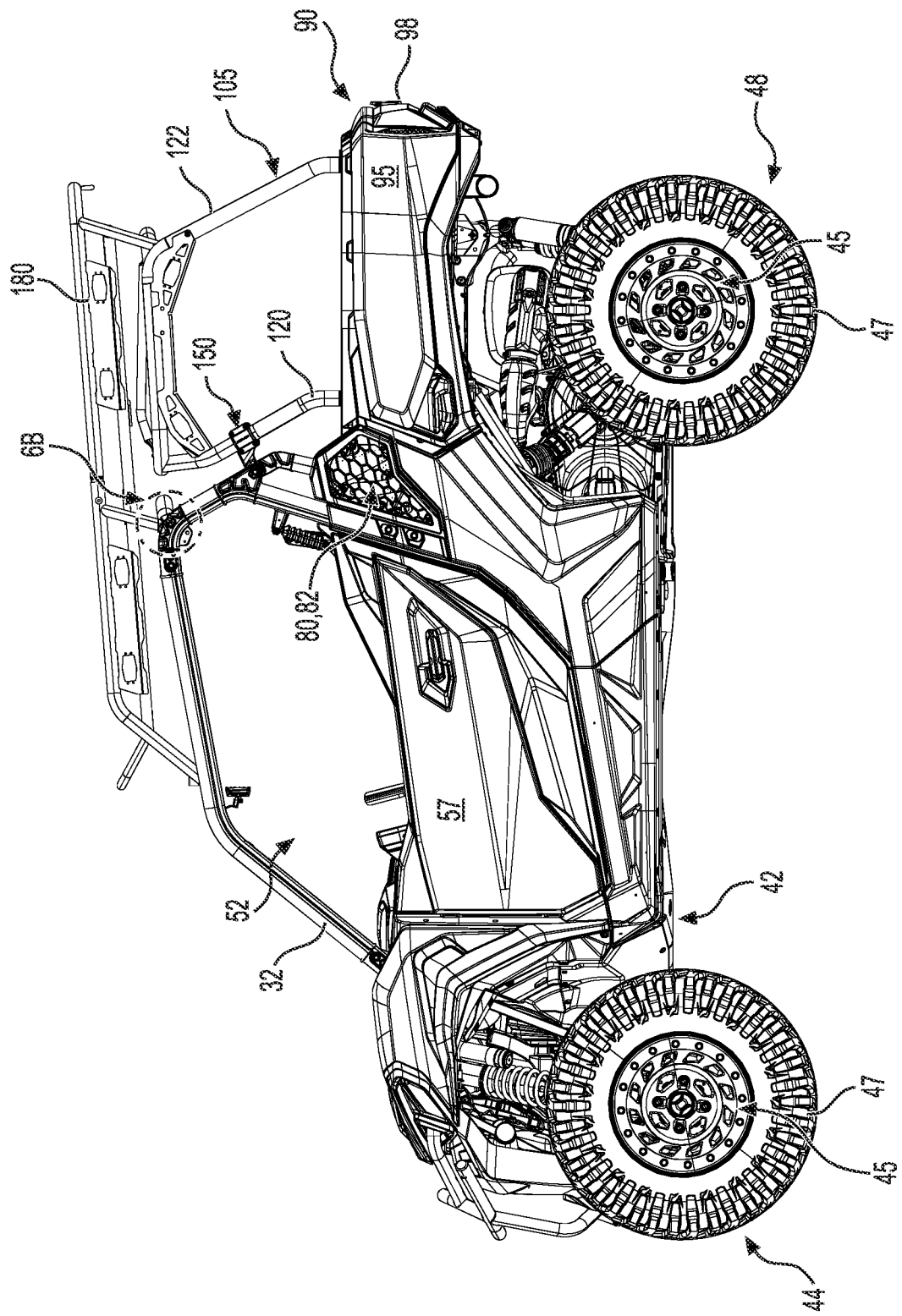
FIG. 6A is a left side elevation view of the vehicle and the support structure of FIG. 1, with a roof rack connected thereto.
Figure 6B:
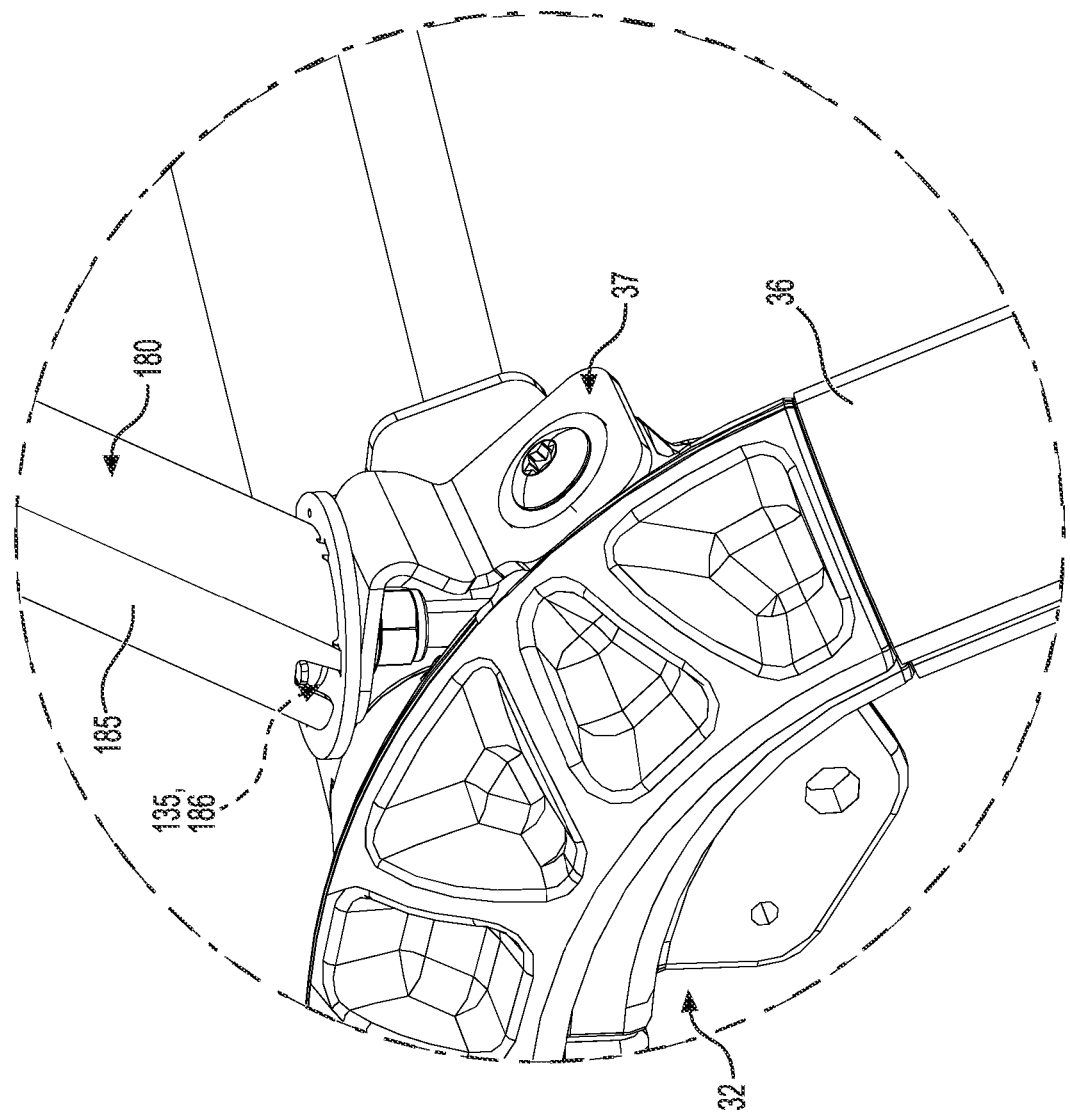
FIG. 6B is a close-up view of a portion 6B of the vehicle and the roof rack of FIG. 6A.

Referring to FIGS. 1 to 3, the two-seat SSV 40 will be described. The two-seat SSV vehicle 40 has a frame 42 connected to a roll cage 32. The roll cage 32 includes a front top member 33 and a rear top member 35. The roll cage 32 also includes two rear members 36 extending downward from the rear top member 35. As is further illustrated in FIG. 13, the roll cage 32 defines a plurality of through-holes for receiving fasteners therethrough for connecting one or more roof accessories (described further below). Rearward of the front top member 33 are two through-holes 133. Adjacent to right and left ends of the rear top member 35 are also defined two through-holes 135. As is illustrated in FIG. 6B, in the present embodiment each of the through-holes 135 is specifically defined in a bracket 37 fastened to the roll cage 32. In some embodiments, the SSV 40 could have the through-holes 135 defined in the roll cage as constructed.

The SSV 40 includes two front wheels 44 connected to a front of the frame 42 by front suspension assemblies 46, and two rear wheels 48 connected to the frame 42 by rear suspension assemblies 50. The suspension assemblies 46, 50 are pivotally connected to the frame 42. Each one of the front and rear wheels 44, 48 has a rim 45 and a tire 47 thereon. The rims 45 and tires 47 of the front wheels 44 may differ in size from the rims and tires of the rear wheels 48. Ground engaging members other than wheels 44, 48 are contemplated for the vehicle 40, such as tracks or skis. In addition, although four ground engaging members are illustrated in the accompanying Figures, the vehicle 40 could include more or fewer than four ground engaging members. Furthermore, different combinations of ground engaging members, such as tracks used in combination with skis, are contemplated.

The frame 42 defines a central cockpit area 52 inside which are disposed a driver seat 54 and a passenger seat 56. The driver seat 54 and the passenger sat 56 are arranged side-by-side, forming one row 59 of seating. In the present embodiments, the driver seat 54 is disposed on a left side of the vehicle 40 and the passenger seat 56 is disposed on a right side of the vehicle 40. It is contemplated that the driver seat 54 could be disposed on the right side of the SSV 40 and that the passenger seat 56 could be disposed on the left side of the SSV 40. In some embodiments, the row 59 of seating could be instead formed by one bench seat, wherein the driver seat 54 and the passenger seat 56 could be portions of a bench seat further including a central seat portion. The SSV 40 includes two doors 57 to provide access to the cockpit area 52 and the seats 54, 56.

A steering wheel 66 is disposed in front of the driver seat 54. The steering wheel 66 is used to turn the front wheels 44 to steer the vehicle 40. The frame 42 also defines a power pack area 70 rearward of the cockpit area 52. A power pack 72 is connected to the frame 42 in the power pack area 70. The power pack 72 includes a motor 74, specifically an internal combustion engine 74 (schematically shown in FIG. 2) connected to a continuously variable transmission (CVT) 76 disposed on a left side of the engine 74. The CVT 76 is on the driver side (left side) of the vehicle 40. The CVT 76 is operatively connected to the front wheels 44 by a front prop shaft and differential (not shown) and to the rear wheels 48 by a transaxle (not shown) to transmit torque from the engine 74 to the front and rear wheels 44, 48 to propel the vehicle 40. It is contemplated that a dual clutch transmission could be used instead of a CVT, as well as other known automatic, semiautomatic or manual transmission and sub-transmissions. An engine control unit (ECU) (not shown) electronically controls different parameters and operating conditions of the engine 74 and of several components of the power pack 72. The power pack 72 also includes an air intake system 80 operatively connected to power pack 72. Air intake grilles 82 are provided on either sides of the vehicle 40, rearward of the cockpit area 52. In the present embodiment, the left air intake grille 82 provides air to the CVT 76, and the right air intake grille (not shown) provides air to the engine 74. In other implementations, the power pack 72 could include at least one electric motor, power electronics module and a battery pack in replacement of or in complement of the internal combustion engine 74.

The SSV 40 further includes a cargo box 90 disposed above the power pack area 70 and rearward of the seats 54, 56. The cargo box 90 is illustrated with an accessory support structure 105 connected thereto; the support structure 105 is selectively connected to or removed from the cargo box 90 (described in more detail below). The cargo box 90 is pivotally connected to the frame 42 and is pivotable between at least a lowered position (shown in FIGS. 1 and 2) and a raised position (FIG. 3). Levers 92 are provided on the left and right sides of the cargo box 90 (only the left lever 92 being illustrated) and are connected to a cargo box lock 94 (FIG. 3). When the cargo box 90 is in the lowered position and any one of the levers 92 is actuated, the cargo box lock 94 is unlocked from the frame 42 and the cargo box 90 is pivotable towards the raised position. A gas strut 96 is pivotally connected between the cargo box 90 and the frame 42 to facilitate the upward motion of the cargo box 90 toward the raised position. When the cargo box 90 is pivoted downwards from the raised position to the lowered position, the cargo box lock 94 engages the frame 42 and the cargo box 90 is locked in the lowered position.

As can be seen in FIG. 1, the cargo box 90 has a floor 91. A front wall 93 extends upwardly from a front end of the floor 91. A left side wall 95 extends upwardly from a left side of the floor 91. A right side wall 97 extends upwardly from a right side of the floor 91. The cargo box 90 further has a tailgate 98 movable between an open position (not shown) and a closed position, as shown in the Figures.

As will be described in more detail below and is illustrated in the Figures, the SSV 40 is provided with a vehicle roof accessory assembly 100 in non-limiting embodiments of the present technology. Components of the vehicle roof accessory assembly 100 are also configured for use with a four-seat side-by-side vehicle (SSV) 200, described briefly herein with reference to FIG. 4 to simplify below descriptions of the vehicle roof accessory assembly 100. Elements of the SSV 200 that are similar to those of the SSV 40 retain the same reference numeral and will generally not be described again.

The four-seat SSV vehicle 200 has a frame 242 connected to a roll cage 232. The frame 242 and the roll cage 232 define a central cockpit area 252 inside which are disposed the driver seat 54 and the passenger seat 56 in a first row 59 of seating. The SSV 200 further includes a second row 259 of seating disposed in the cockpit 252, including two additional passenger seats 256 disposed side-by-side (illustrated schematically). The second row 259 of seating is accessible by two additional doors 257 (a left door 257 being illustrated). It is contemplated that the two rear passenger seats 256 could be portions of a bench seat further including a central seat portion.

Figure 13:
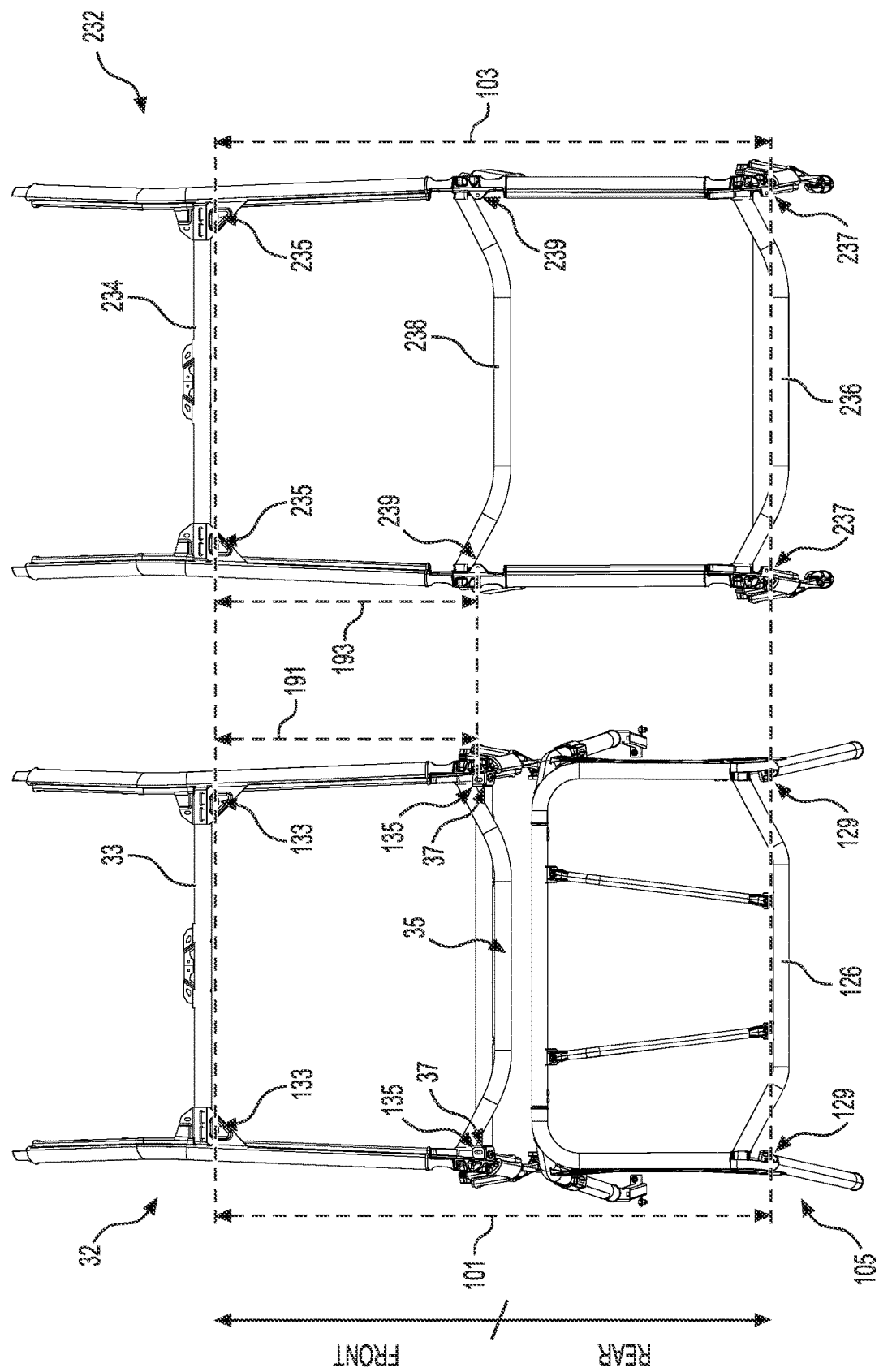
FIG. 13 is a top plan view of a roll cage and the support structure of the vehicle of FIG. 1 and a roll cage of the vehicle of FIG. 4.

The roll cage 232 includes a top front member 234 and a top rear member 236 (illustrated in additional detail in FIG. 13). Between the front and rear members 234, 236, the roll cage 232 also includes a top, intermediate member 238. The roll cage 232 defines a plurality of through-holes for receiving fasteners therethrough for connecting accessories to the roll cage 232. Two through-holes 235 are defined in a forward portion of the roll cage 232, rearward of the front member 234. The roll cage 232 also defines two through-holes 237 in a rear portion of the roll cage 232, adjacent to the left and right ends of the rear member 236. The roll cage 232 further defines two through-holes 239 in an intermediate portion of the roll cage 232, adjacent to the left and right ends of the intermediate member 238.

As is illustrated in FIGS. 4 to 7 and mentioned briefly above, the SSV 40 and/or the SSV 200 includes the vehicle roof accessory assembly 100 according to non-limiting embodiments of the present technology. In some cases the vehicle roof accessory assembly 100 could be provided with the SSV 40 and/or the SSV 200 and in some cases the operator could separately procure the vehicle roof accessory assembly 100 and then connect to the SSV 40 and/or the SSV 200. The vehicle roof accessory assembly 100 includes the support structure 105 and one or more vehicle roof accessories. The vehicle roof accessories, according to the present embodiments include: a roof 160 (FIGS. 4, 5 and 7) and a roof rack 180 (FIGS. 4, 6A, 6B, and 7) for selectively connecting to the SSV 40, 200. In some non-limiting embodiments, the accessory assembly 100 could include only the support structure 105 and the roof 160. In some other non-limiting embodiments, the accessory assembly 100 could include only the support structure 105 and the roof rack 180. In some other embodiments of the accessory assembly 100, only the roof 160 and the roof rack 180 may be provided, specifically for the SSV 200. In some cases, the support structure 105 could be provided separately from the roof 160 and/or the roof rack 180. It is also contemplated that the accessory assembly 100 could include additional components, including but not limited to: fasteners for connecting the assembly 100 to the SSV 40, 200. In some embodiments, the bracket 37 could be included with the vehicle roof accessory assembly 100 to adapt the roll cage 32.

Figure 4:
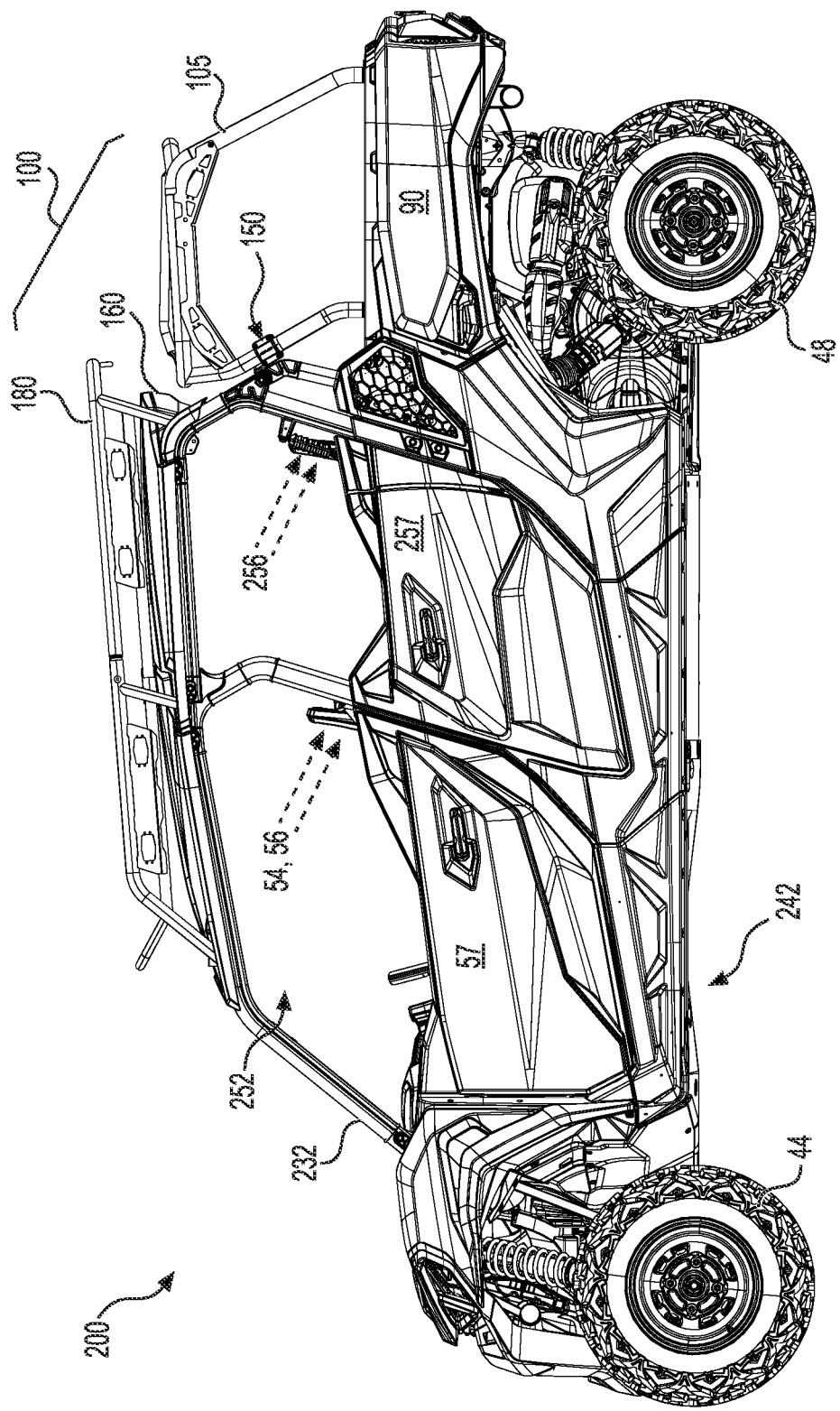
FIG. 4 is a left side elevation view of a four-seat side-by-side vehicle (SSV), with the support structure connected thereto.
Figure 5:
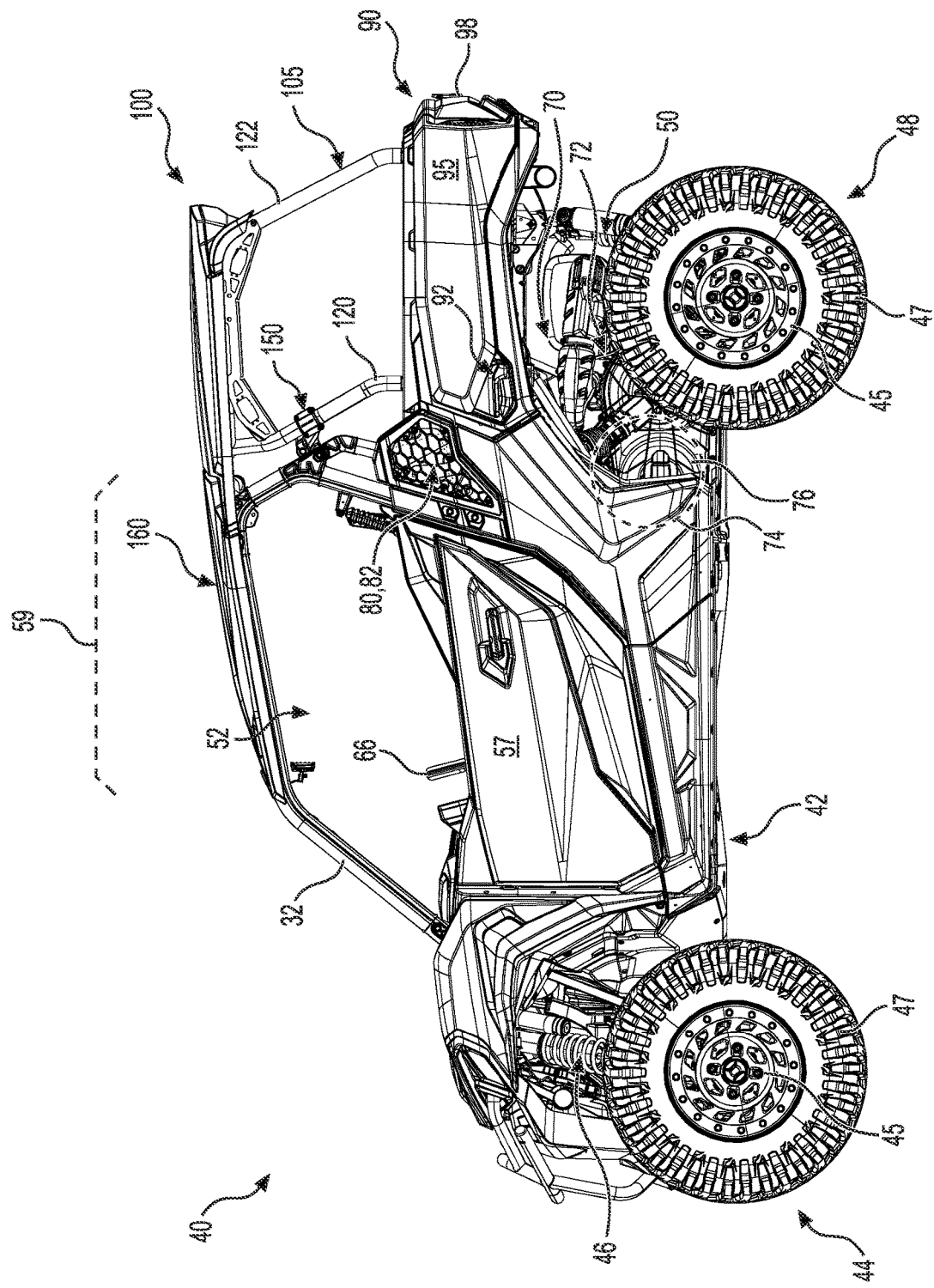
FIG. 5 is a left side perspective view of the vehicle and the support structure of FIG. 1, with a roof connected thereto.
Figure 7:
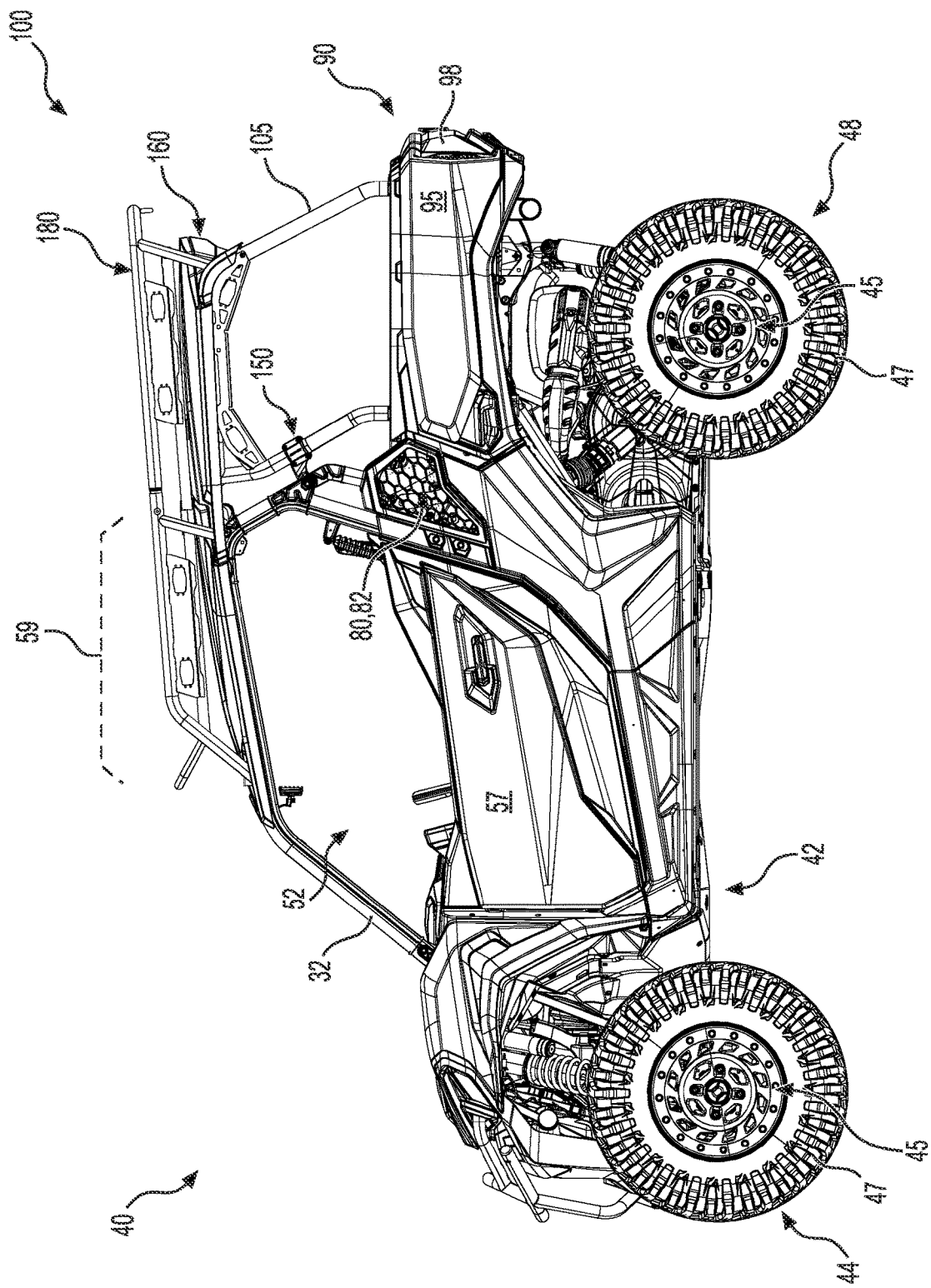
FIG. 7 is a left side elevation view of the vehicle and the support structure of FIG. 1, with the roof and the roof rack connected thereto.

As can be seen in the FIGS. 5 to 7, the roof 160 and the roof rack 180, when installed on the SSV 40, connect to and extend over the roll cage 32 and extend rearward over the cargo box 90. In the case of the roof 160, extending over the cockpit area 52 and the cargo box 90 provides at least partial protection of the cockpit area 52 and the cargo box 90 from the elements (e.g. sun or rain). In the case of the roof rack 180, extending over the cargo box 90 in addition to over the roll cage 32 provides a greater area for attaching cargo compared to a roof rack disposed over only the roll cage 32. As is illustrates in FIGS. 4 and 7, the roof 160 and the roof rack 180 can also be simultaneously connected to the SSV

40, 200, to provide both protection from the elements and roof-top cargo capabilities. In order to extend rearward from the roll cage 32, the support structure 105 is installed on the cargo box 90 to support rear portions of the roof 160 and/or the roof rack 180, as the case may be.

As can be seen in FIG. 4, the roof 160 and the roof rack 180 are sized and arranged to connect to the roll cage 232 of the four-seat SSV 200. As will be described in more detail below, by configuring the roll cage 32 and the support structure 105 to match the form of the roll cage 232, the roof 160 and the roof rack 180 of the vehicle roof accessory assembly 100 can be utilized for the two-seat SSV 40 with one row 59 of seating or the four-seat SSV 200 with two rows 59, 259 of seating. This provides at least some flexibility of use and manufacturing, as one design of the accessory assembly 100 may be manufactured and used for the vehicle 40 with one row 59 of seating and the vehicle 200 with two rows 59, 259 of seating. It is also noted that the support structure 105 can be installed on the cargo box 90 of the four-seat SSV 200 to provide an additional rack structure, for example for attaching items thereto, including but not limited to: tools, sports equipment, and hunting equipment. In the case of the SSV 200, however, the support structure 105 does not connect to the roof 160 or the roof rack 180 when also installed on the SSV 200.

Figure 8:
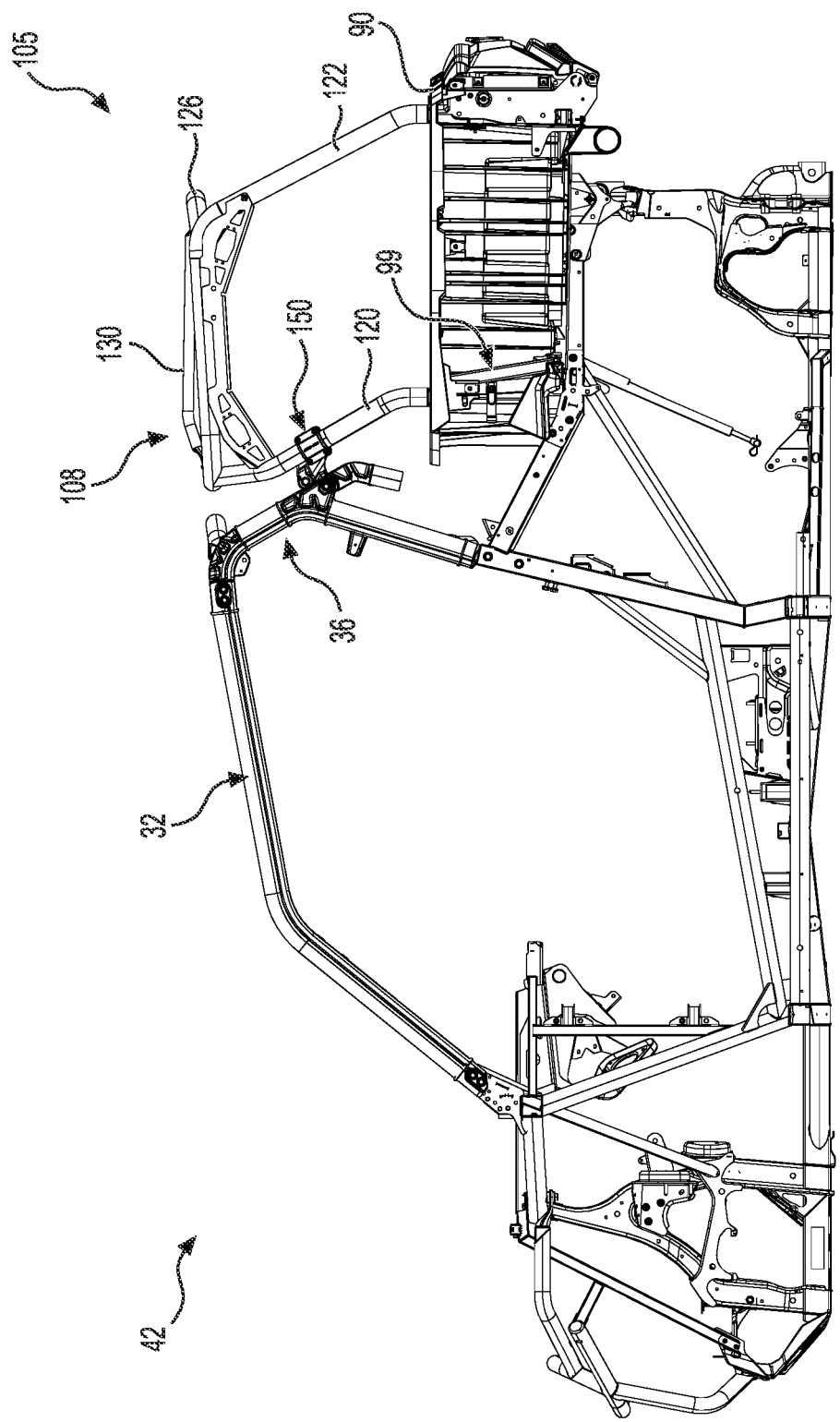
FIG. 8 is a left side elevation view of a frame, the cargo box, and the support structure of the vehicle of FIG. 1.
Figure 9:
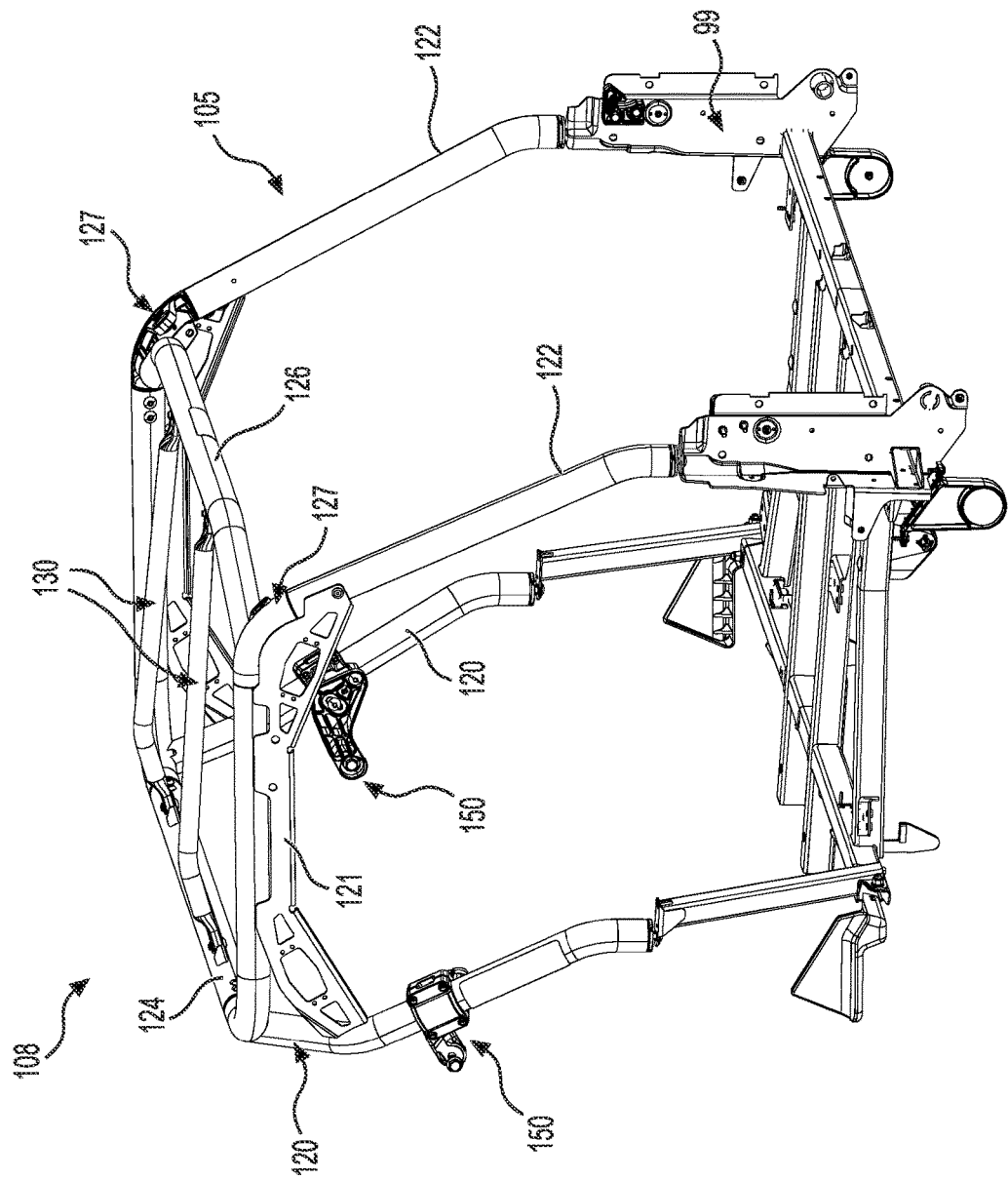
FIG. 9 is a rear, left side perspective view of the support structure and a frame of the cargo box of the vehicle of FIG. 1.
Figure 10:
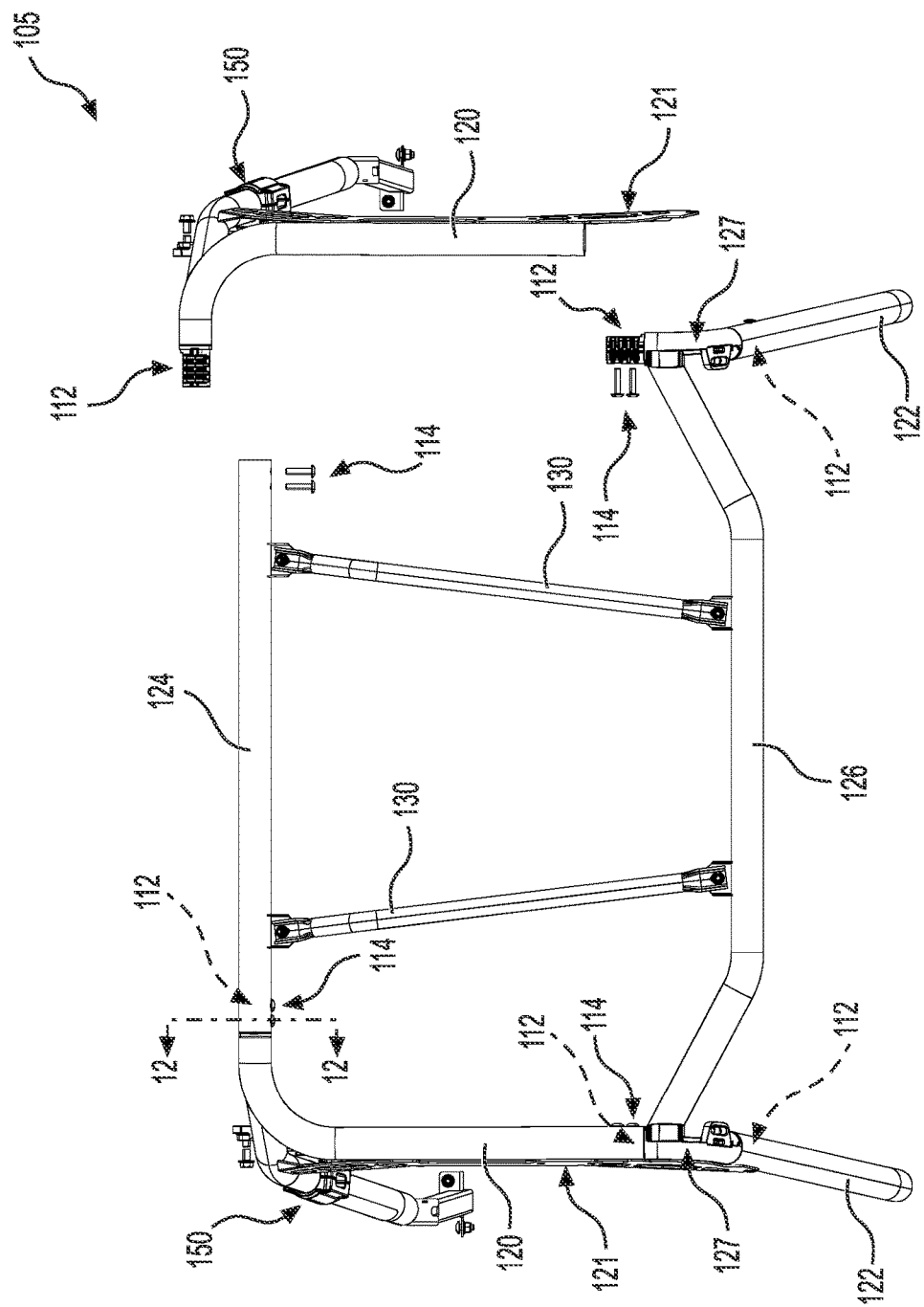
FIG. 10 is a top plan view of the support structure of the vehicle of FIG. 1.

With additional reference to FIGS. 8 to 10, the support structure 105 is described in greater detail. The support structure 105 includes a top frame portion 108. The top frame portion 108 includes a top front member 124 and a rear top member 126. The rear top member 126 includes two end portions 127, forming left and right top rear corners of the support structure 105. The top frame portion 108 further includes two top longitudinal members 130, fastened to and extending between the member 124 and the member 126. The support structure 105 further includes two rear members 122 extending generally downward from the top frame portion 108. Specifically, each rear member 122 is selectively fastened to one of the end portions 127. The support structure 105 also includes two front members 120 extending generally downward from and rearward along the top frame portion 108. As can be seen in FIG. 10, the front members 120 connect to the front top member 124 and the end portion 127 of the rear member 126. The member 120 also includes a side plate 121 welded thereto. Each side plate 121 is further fastened to a corresponding one of the rear members 122. In some embodiments, the side plate 121 could be fastened to both the member 120 and the member 122.

Each of the members 120 further includes a bracket 150 for securing the support structure to the roll cage 32, specifically to the rear members 36 of the roll cage 32 (shown disconnected from the roll cage 32 in FIG. 3). The brackets 150, when in use, help in maintaining the relative positioning of the support structure 105 and the roll cage 32. It is contemplated that the brackets 150 could be omitted in some embodiments.

The support structure 105 is illustrated as installed on the SSV 40, without the roof 160 or the roof rack 180, in FIGS. 1 to 3. The support structure 105 is selectively connected to the cargo box 90. In the present embodiment, the support structure 105 is bolted to a frame 99 of the cargo box 90 (see FIG. 9). It is contemplated that the support structure 105 could be differently fastened to the cargo box 90, including for instance by connecting the members 120, 122 to the floor 91 of the cargo box 90.

The support structure 105, in at least some non-limiting embodiments of the present technology, is configured to be selectively disassembled when uninstalled from the SSV 40 and the SSV 200. In some embodiments, for example, the support structure 105 could be dissembled for shipping or storage of the support structure 105 and/or the accessory assembly 100. To allow for selective assembly/disassembly by an operator, the rigid members of the support structure 105 are selectively connected together. Specifically, each of the members 120, 122, 124, 126, and 130 are selectively fastened together and thus are selectively separable. It is contemplated that in some embodiments the rigid members could be selectively connected together by other means, including but not limited to: swaged tube ends for inserting into connecting members, castings welded to all member ends and subsequently fastened together, and castings to some of the member ends and subsequently fastened to other members.

Figure 11:
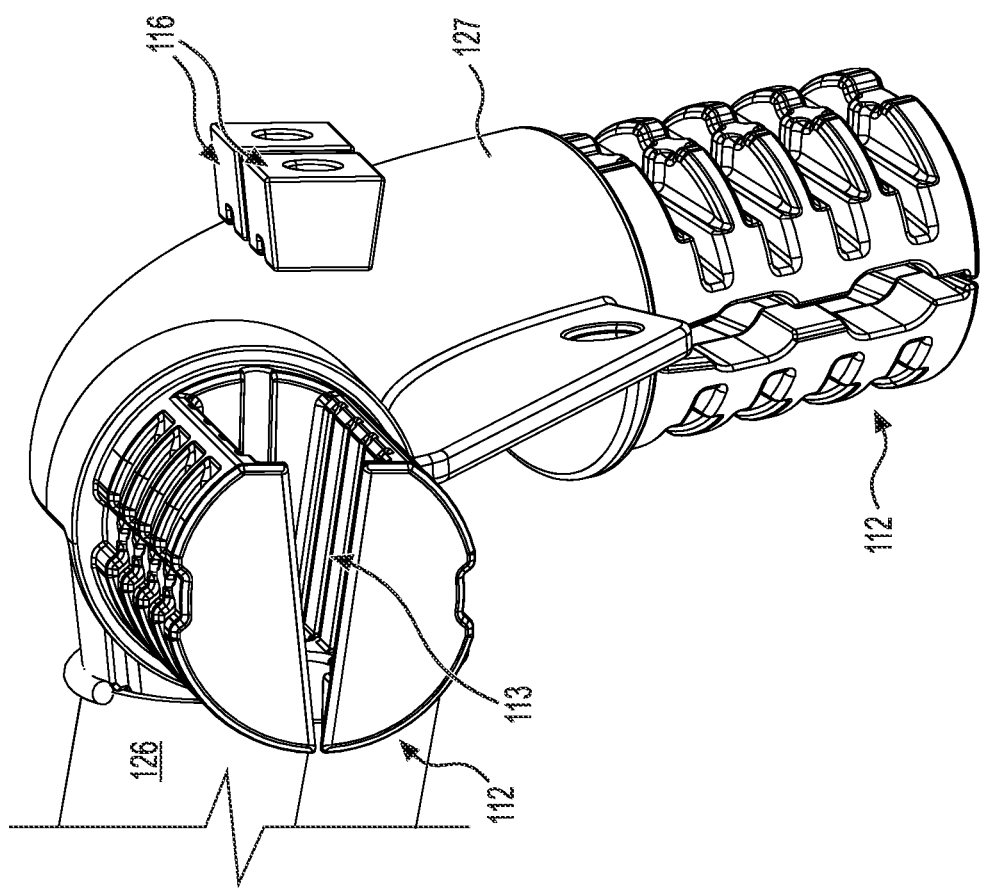
FIG. 11 is a partial, perspective view of a rigid member of the support structure of FIG. 10.
Figure 12:
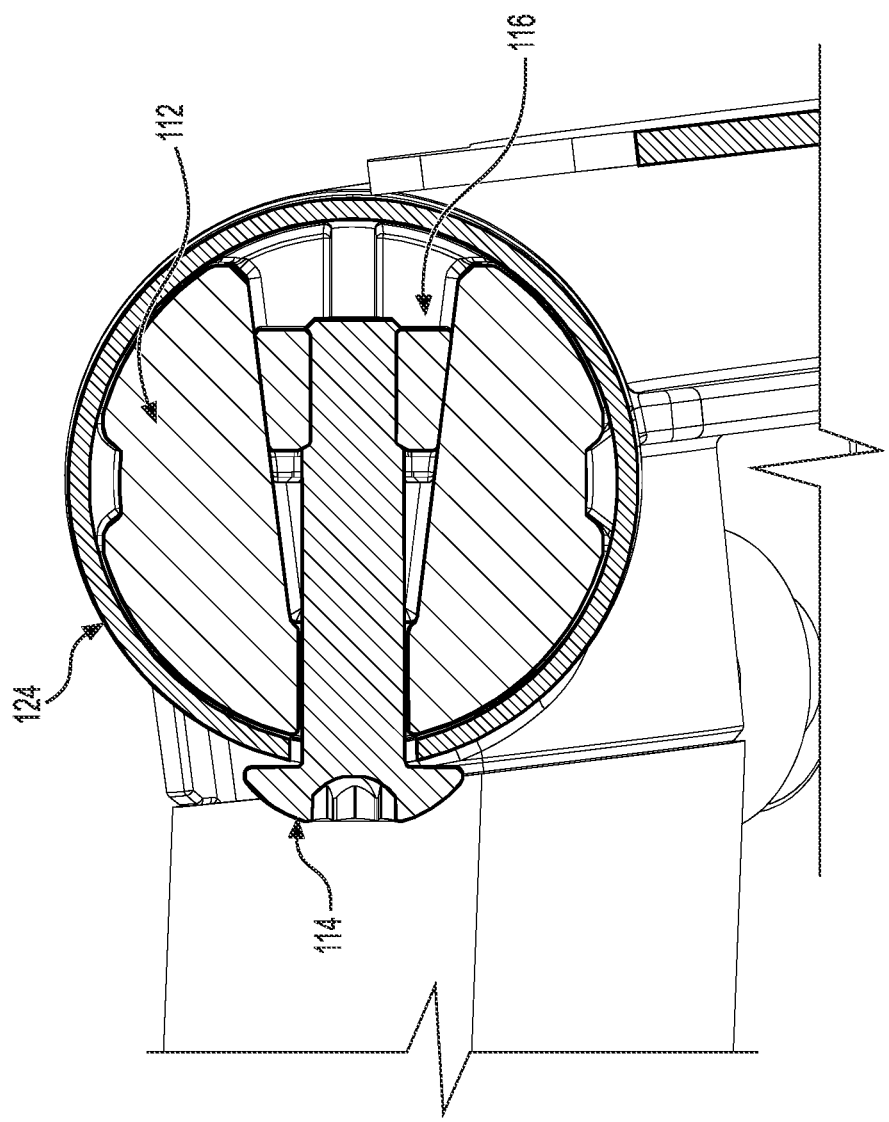
FIG. 12 is a cross-sectional view of a connection portion of the support structure of FIG. 10, taken along line 12-12 of FIG. 10.

In the present embodiment, the top members 130 are bolted at a front end to the member 124 and at a rear end to the member 126. The members 120, 122, 124, and 126 are selectively assembled together using an arrangement of expandable male connecting portions 112 and bolts 114 inserted into the member connecting thereto, as is illustrated in FIG. 10 and in greater detail in FIGS. 11 and 12.

Each expandable male connecting portion 112 defines a V-shaped notch 113 therein. Each expandable male connecting portion 112 also includes two truncated V-shaped nuts 116 disposed in the V-shaped notch 113. It is contemplated that one V-shaped nut 116 may be used in some embodiments. When the male portion 112 is inserted into the member connecting thereto (the member 124 in the example illustrations), two bolts 114 are inserted through the connecting member 124 and through the male portion 112 to engage with the nuts 116. By tightening the bolts 114, the nuts 116 are drawn into the V-shaped notch 113. This causes the V-shaped notch 113, and thus an outer circumference of the male portion 112, to expand. The male portion 112 thus engages with an interior surface of the connecting member 124, aiding in maintaining connection between the male portion 112 and the connecting member 124 (in addition to the bolts 114). It is noted that the notch 113 is wider, in the present embodiment, than the width of the nuts 116 to allow some adjustment for proper fit, although this may vary in different embodiments.

In addition to supporting the roof 160 and/or the roof rack 180 as described above, the support structure 105 also provides two through-holes 129 defined therein for receiving fasteners for connecting the roof 160 and/or the roof rack 180 thereto. In the present embodiment, the through-holes 129 are formed by the end portions 127 (see FIG. 13).

As can be further seen from FIG. 13, the roll cage 32 and the support structure 105 are sized and configured to generally match the size and configuration of the roll cage 232 of the SSV 200. For instance, a distance 101 between the through-holes 133 and 129 for the SSV 40 is equal to a distance 103 between the through-holes 235 and 237 of the roll cage 232 of the SSV 200. Similarly, a distance 191 between the through-holes 133 and 135 is equal to a distance 193 between the through-holes 235 and 239. In this way, a roof accessory, such as the roof 160 and the roof rack 180, arranged to fasten to the through-holes 235, 237, and 239 of the SSV 200 is also capable of fastening to the through-holes 133, 135, and 129 of the SSV 40, using both the roll cage 32 and the support structure 105.

Figure 14:
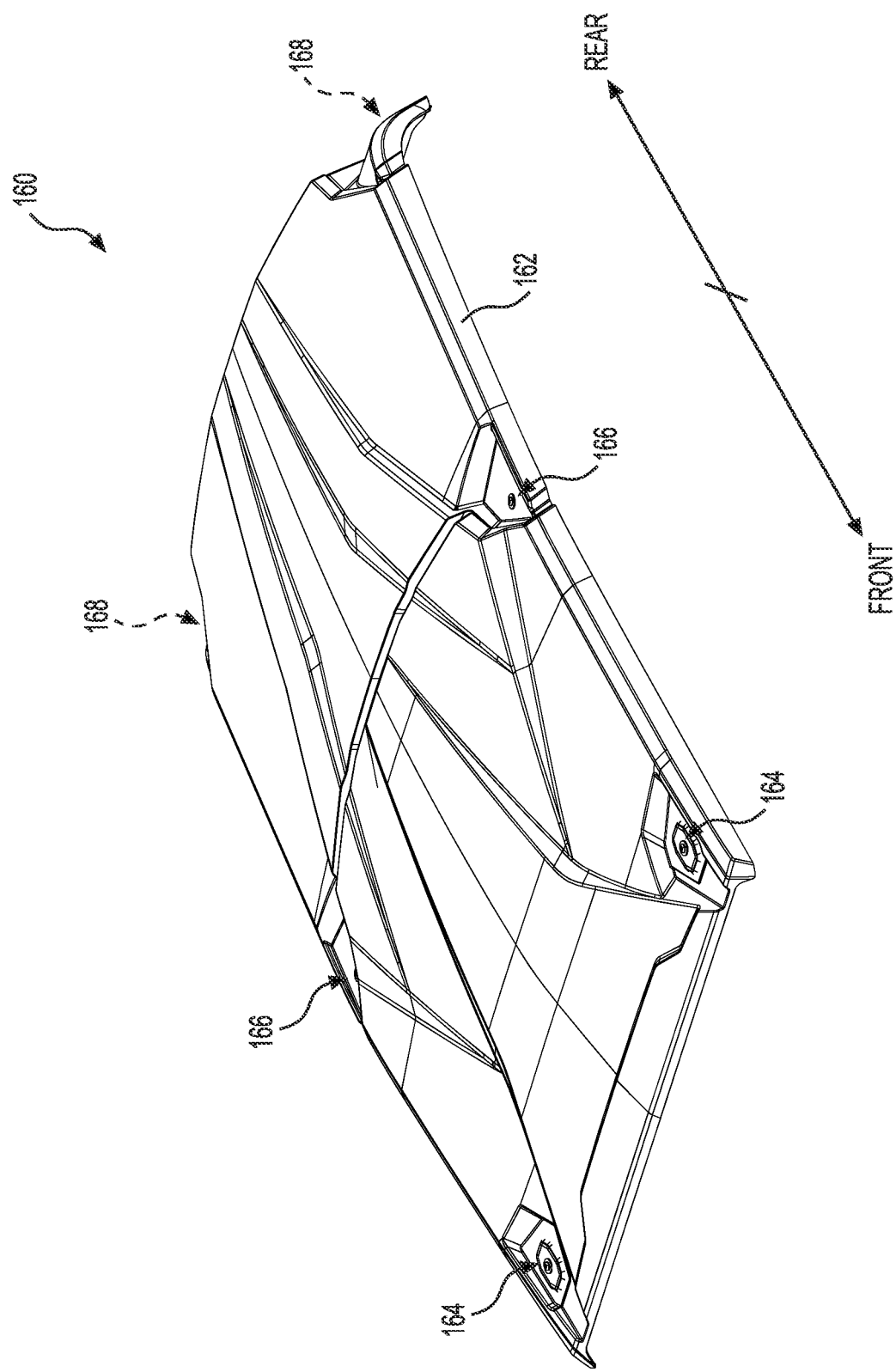
FIG. 14 is a top, front, left side perspective view of the roof of FIG. 5.
Figure 15:
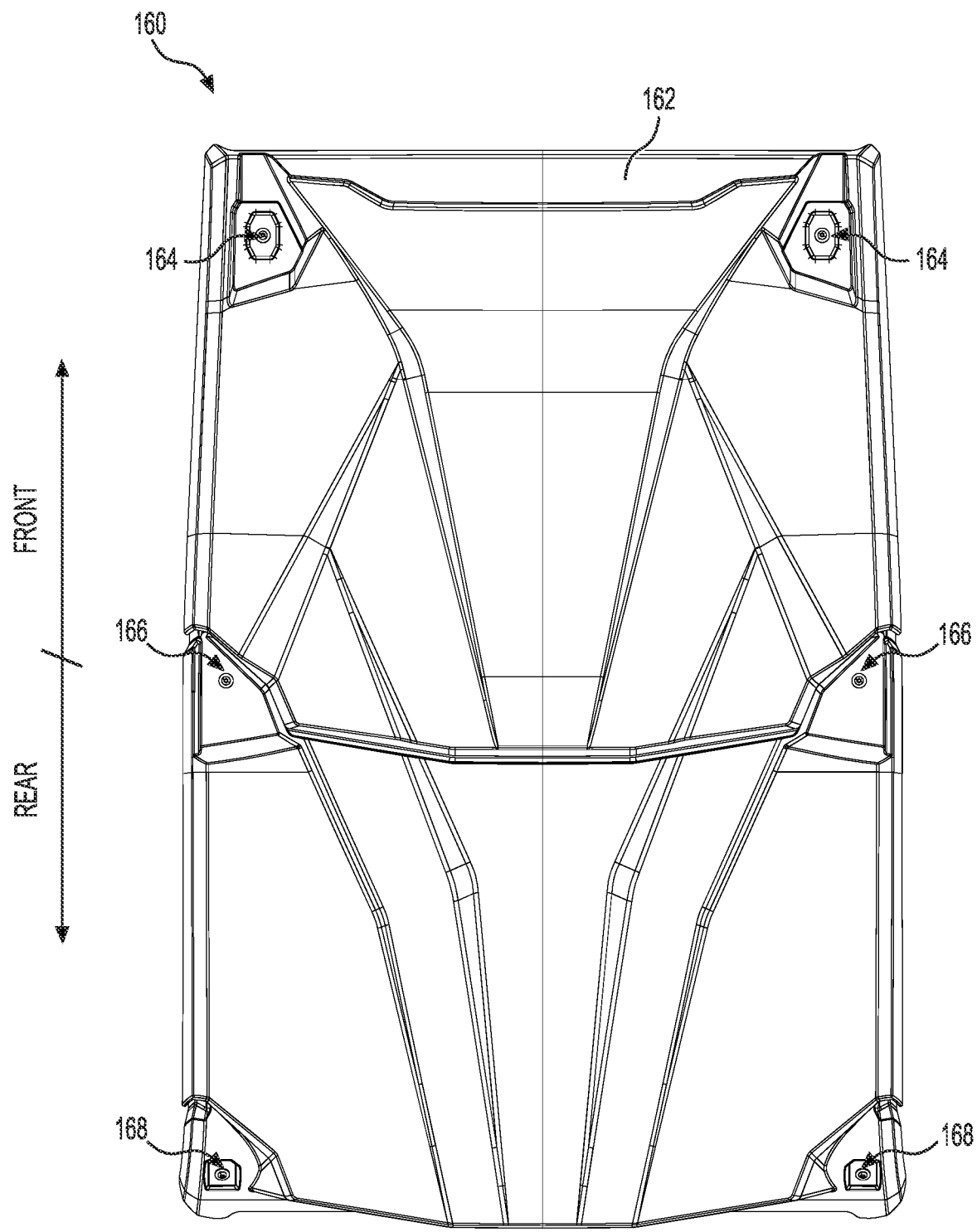
FIG. 15 is a top plan view of the roof of FIG. 14.

With reference to FIGS. 14 and 15, the roof 160 is illustrated in greater detail and in isolation. The roof 160 includes a roof body 162 which, when installed on the SSV 40, provides cover for at least a portion of the cockpit area 52. The roof 160 also includes a plurality of through-holes defined in the roof body 162 for receiving therethrough fasteners for connecting the roof 160 to the roll cage 32 and the support structure 105, or to the roll cage 232.

Specifically, there are two forward through-holes 164 defined in a forward portion of the roof body 162. When installed on the SSV 40, the holes 164 are aligned with the holes 133. When installed on the SSV 200, the holes 164 are aligned with the holes 235. The roof body 162 also defines two intermediate through-holes 166 rearward of the forward through-holes 164, at a distance equal to the distances 191, 193 from the holes 164. When installed on the SSV 40, the holes 166 are aligned with the holes 135. When installed on the SSV 200, the holes 166 are aligned with the holes 239. The roof body 162 further defines two rear through-holes 168 rearward of the intermediate through-holes 166, at a distance from the front through-holes 164 equal to the distances 101, 103. When installed on the SSV 40, the holes 168 are aligned with the holes 129 of the support structure 105. When installed on the SSV 200, the holes 166 are aligned with the holes 237 of the roll cage 232. Fasteners are then inserted and fastened through the aligned through-holes.

Figure 16:
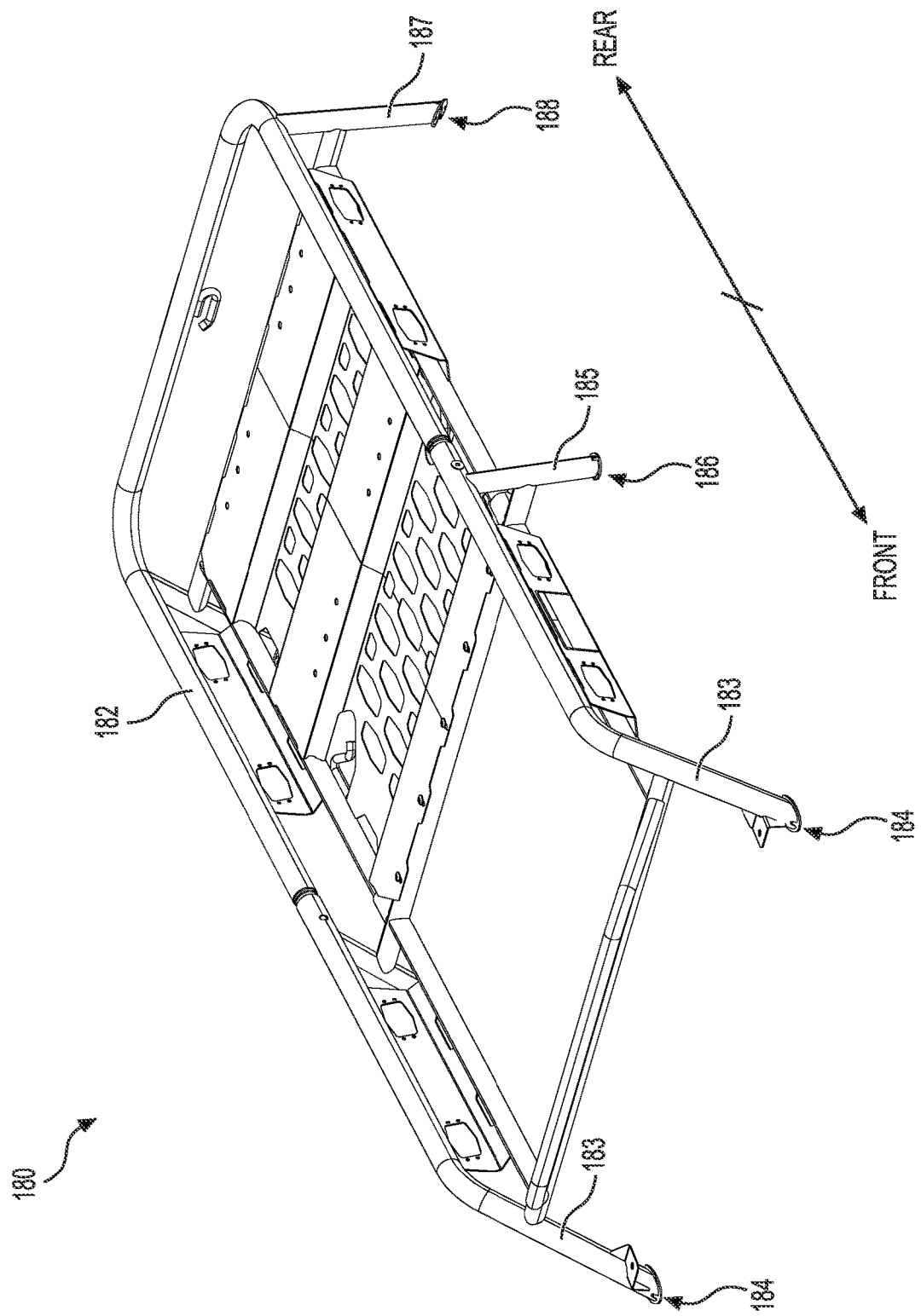
FIG. 16 is a top, front, left side perspective view of the roof rack of FIG. 6A.
Figure 17:
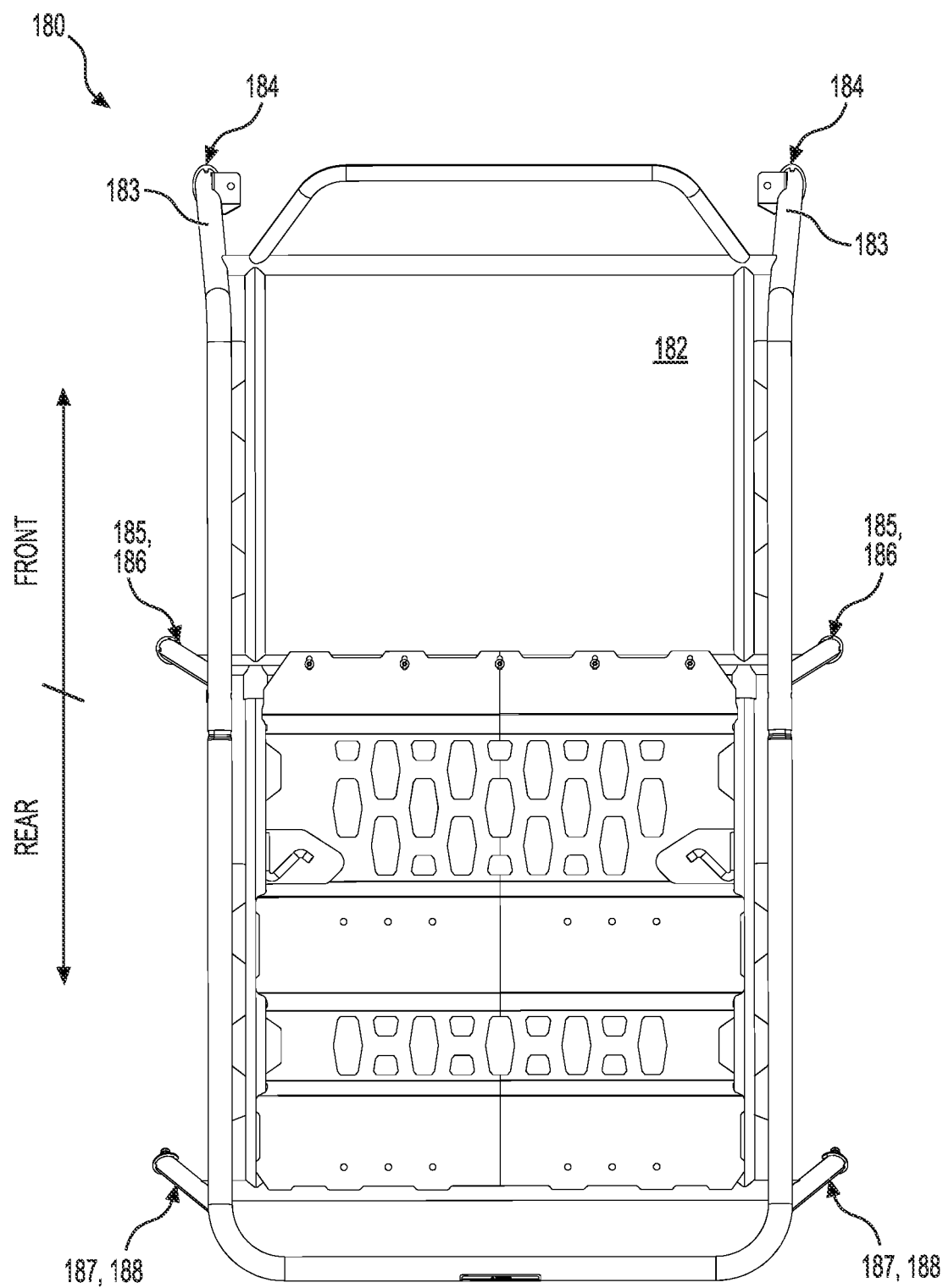
FIG. 17 is a top plan view of the roof rack of FIG. 16.

The roof rack 180, as shown in isolation in FIGS. 16 and 17, includes a rack body 182 which, when installed on the SSV 40, extends over at least a portion of the cockpit area 52. The roof rack 180 also includes a plurality of through-holes defined in the rack body 182 for receiving therethrough fasteners for connecting the roof rack 180 to the roll cage 32 and the support structure 105.

Specifically, there are two front members 183 extending forward and downward from the rack body 182, in each of which is defined a through-hole 184. When installed on the SSV 40, the holes 184 are aligned with the holes 133. When installed on the SSV 200, the holes 184 are aligned with the holes 235. The roof rack 180 also includes two intermediate members 185, rearward of the front members 183, extending generally downward from the rack body 182, in each of which is defined a through-hole 186, at a distance equal to the distances 191, 193 from the holes 184. When installed on the SSV 40, the holes 186 are aligned with the holes 135 in the brackets 37. When installed on the SSV 200, the holes 186 are aligned with the holes 239.

The roof rack 180 also includes two rear members 187, rearward of the front and intermediate members 183, 185, extending generally downward from the rack body 182, in each of which is defined a through-hole 188. The through-holes 188 are defined in the roof rack 180 at a distance from the front through-holes 184 equal to the distances 101, 103. When installed on the SSV 40, the holes 188 are aligned with the holes 129 of the support structure 105. When installed on the SSV 200, the holes 186 are aligned with the holes 237 of the roll cage 232. Fasteners are then inserted and fastened through the aligned through-holes. In some embodiments, the roof rack 180 could include fasteners (such as carriage bolts) in the members 183, 185, 187 directly, such that the steps of arranging the roof rack 180 and fastening the roof rack 180 to the SSV 40, 200 are performed together.

As mentioned above, the roof 160 and the roof rack 180 are configured to the simultaneously installed on the SSV 40 (FIG. 7) or the SSV 200 (FIG. 4), specifically with the roof rack 180 disposed on a top surface of the roof 180. When both the accessories 160, 180 are installed on the SSV 40, the holes 164 of the roof 160 are aligned with the holes 133 of the roll cage 32 and the holes 184 of the roof rack are aligned with the holes 164 of the roof 160; the holes 166 of the roof 160 are aligned with the holes 135 of the roll cage 32 and the holes 186 of the roof rack 180 are aligned with the holes 166 of the roof 160; and the holes 168 of the roof 160 are aligned with the holes 129 of the support structure 105 and the holes 188 are aligned with the holes 168 of the roof 160. When both the accessories 160, 180 are installed on the SSV 200, the holes 164 of the roof 160 are aligned with the holes 235 of the roll cage 232 and the holes 184 of the roof rack are aligned with the holes 164 of the roof 160; the holes 166 of the roof 160 are aligned with the holes 239 of the roll cage 232 and the holes 186 of the roof rack 180 are aligned with the holes 166 of the roof 160; and the holes 168 of the roof 160 are aligned with the holes 237 of the roll cage 232 and the holes 188 are aligned with the holes 168 of the roof 160. Fasteners are then inserted and fastened through the aligned through-holes.

The SSV 40 and the vehicle roof accessory assembly 100 implemented in accordance with some non-limiting embodiments of the present technology can be represented as follows, presented in numbered clauses.

CLAUSE 1. A vehicle roof accessory assembly (100), comprising: an accessory support structure (105) adapted for selectively connecting to a cargo box (90) of a side-by-side vehicle (40); and at least one vehicle roof accessory (160, 180), the at least one vehicle roof accessory (160, 180) being adapted for selectively connecting to a roll cage (32) of the vehicle (40) and the accessory support structure (105) when connected to the cargo box (90), the side-by-side vehicle (40) having one row (59) of seating.

CLAUSE 2. The vehicle roof accessory assembly (100) of clause 1, wherein the at least one roof accessory (160, 180) is further adapted for connecting to a roll cage (232) of a side-by-side vehicle (200) having two rows (59, 259) of seating.

CLAUSE 3. The vehicle roof accessory assembly (100) of clause 1 or 2, wherein the at least one roof accessory (160, 180) is at least one of: a roof (160) for selectively covering at least a portion of a cockpit area (52) of the vehicle (40); and a roof rack (180) for selectively extending over at least a portion of the cockpit area (52).

CLAUSE 4. The vehicle roof accessory assembly (100) of clause 3, wherein the at least one roof accessory (160, 180) includes: the roof (160); and the roof rack (180).

CLAUSE 5. The vehicle roof accessory assembly (100) of any one of clauses 1 to 4, wherein the accessory support structure (105) comprises a plurality of rigid members (120, 122, 124, 126, 130) selectively connected together.

CLAUSE 6. The vehicle roof accessory assembly (100) of clause 5, wherein the plurality of rigid members (120, 122, 124, 126, 130) of the accessory support structure (105) are selectively fastened together.

CLAUSE 7. The vehicle roof accessory assembly (100) of clause 6, wherein: at least one of the plurality of rigid members (120, 122, 124, 126, 130) includes at least one male connecting portion (112) to be received in at least one other of the plurality of rigid members (120, 122, 124, 126, 130); the at least one male connecting portion (112) defines a V-shaped notch (113) therein; and further comprising at least one V-shaped nut (116) disposed in the V-shaped notch (113).

CLAUSE 8. The vehicle roof accessory assembly (100) of clause 6, wherein the support structure (105) comprises: a top frame portion (108); two front members (120) extending generally downward from the top frame portion (108); and two rear members (122) extending generally downward from the top frame portion (108).

CLAUSE 9. An off-road vehicle (40) comprising: a frame (42); a motor (76) connected to the frame (42); a plurality of ground engaging members (44, 48) operatively connected to the frame (42), at least one ground engaging member (44, 48) of the plurality of ground engaging members (44, 48) being operatively connected to the motor (76); a roll cage (32) connected to the frame (42), the roll cage (32) defining at least in part a cockpit area (52); two seats (54, 56) connected to the frame (42), the two seats (54, 56) being disposed side by side in the cockpit area (52); a cargo box (90) connected to the frame (42) rearward of the two seats (54, 56), the cargo box (90) having a floor (91), a front wall (93) extending upwardly from a front end of the floor (91), a left side wall (95) extending upwardly from a left side of the floor (91), a right side wall (97) extending upwardly from a right side of the floor (91); and an accessory support structure (105) selectively connected to the cargo box (90), the support structure (105) extending generally upward from the cargo box (90), the accessory support structure (105) being adapted for selectively receiving at least one rooftop accessory (160, 180), the at least one rooftop accessory (160, 180) being adapted for extending over and selectively connecting to the roll cage (32) and the support structure (105).

CLAUSE 10. The vehicle (40) of clause 9, further comprising the at least one rooftop accessory (160, 180); and wherein the at least one rooftop accessory (160, 180) is selectively connected to the roll cage (32) and the support structure (105).

CLAUSE 11. The vehicle (40) of clause 10, wherein the at least one rooftop accessory (160, 180) is selectively fastened to the roll cage (32) and the support structure (105).

CLAUSE 12. The vehicle (40) of clause 10, wherein the at least one rooftop accessory (160, 180) is selectively connected to: a top portion of the roll cage (32); and a top portion (108) of the support structure (105).

CLAUSE 13. The vehicle (40) of clause 10, wherein the at least one rooftop accessory (160, 180) is one of: a roof (160) for covering a top side portion of the cockpit area (52); and a roof rack (180) extending over the top side portion of the cockpit area (52).

CLAUSE 14. The vehicle (40) of clause 10, wherein the at least one rooftop accessory (160, 180) is: a roof (160) selectively fastened to the roll cage (32) and the support structure (105), the roof (160) being adapted for covering a top side portion of the cockpit area (52); and a roof rack (180) selectively fastened to the roof (160).

CLAUSE 15. The vehicle (40) of any one of clauses 9 to 14 wherein the support structure (105) comprises: a top frame portion (108); two front members (120) extending generally downward from the top frame portion (108); and two rear members (122) extending generally downward from the top frame portion (108).

CLAUSE 16. The vehicle (40) of clause 15, wherein the support structure (105) further comprises at least one bracket (150) connected to at least one of the front members (120), the at least one bracket (150) being selectively connected to the roll cage (32).

CLAUSE 17. The vehicle (40) of any one of clauses 9 to 16, wherein the support structure (105) is formed from a plurality of members (120, 122, 124, 126, 130) selectively fastened together by a plurality of fasteners (114), the plurality of members (120, 122, 124, 126, 130) being separable from one another by removing the plurality of fasteners (114) from the support structure (105).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A vehicle roof accessory assembly, comprising:
an accessory support structure adapted for selectively connecting to a cargo box of a side-by-side vehicle; and
at least one vehicle roof accessory,
the at least one vehicle roof accessory being adapted for selectively connecting to a roll cage of the vehicle and the accessory support structure when the accessory support structure is connected to the cargo box, wherein the at least one vehicle roof accessory is configured to span over at least part of the roll cage of the vehicle and at least part of the cargo box when connected to the roll cage and to the accessory support structure, and wherein the at least one vehicle roof accessory is configured to be disposed vertically over the roll cage and the accessory support structure when connected to the roll cage and to the accessory support structure.

2. The vehicle roof accessory assembly of claim 1, wherein the at least one roof accessory is further adapted for connecting to a roll cage of a side-by-side vehicle having a single row of seating.

3. The vehicle roof accessory assembly of claim 2, wherein the at least one roof accessory is at least one of:
a roof for selectively covering at least a portion of a cockpit area of the vehicle; and
a roof rack for selectively extending over at least a portion of the cockpit area.

4. The vehicle roof accessory assembly of claim 1, wherein the at least one roof accessory is at least one of:
a roof for selectively covering at least a portion of a cockpit area of the vehicle; and
a roof rack for selectively extending over at least a portion of the cockpit area.

5. The vehicle roof accessory assembly of claim 4, wherein the at least one roof accessory includes:
the roof; and
the roof rack.

6. The vehicle roof accessory assembly of claim 1, wherein the accessory support structure comprises a plurality of rigid members selectively connected together.

7. The vehicle roof accessory assembly of claim 6, wherein the plurality of rigid members of the accessory support structure are selectively fastened together.

8. The vehicle roof accessory assembly of claim 7, wherein:
at least one of the plurality of rigid members includes at least one male connecting portion to be received in at least one other of the plurality of rigid members;
the at least one male connecting portion defines a V-shaped notch therein; and
further comprising at least one V-shaped nut disposed in the V-shaped notch.

9. The vehicle roof accessory assembly of claim 7, wherein the support structure comprises:
a top frame portion;
two front members extending generally downward from the top frame portion; and
two rear members extending generally downward from the top frame portion.

10. The vehicle roof accessory assembly of claim 1, further comprising two brackets for connecting to the roll cage, each of the two brackets defining a through-hole therethrough for receiving a fastener for connecting the at least one roof accessory thereto.

11. The vehicle roof accessory assembly of claim 1, wherein the vehicle is an off-road vehicle.

12. A vehicle roof accessory assembly, comprising:
    an accessory support structure adapted for selectively connecting to a cargo box of a side-by-side vehicle; and
    at least one vehicle roof accessory, the at least one vehicle roof accessory being adapted for selectively connecting to a roll cage of the vehicle and the accessory support structure when the accessory support structure is connected to the cargo box;
    the accessory support structure including:
        a top frame portion configured to span over at least a portion of the cargo box;
        at least one front member extending downward from a front end of the top frame portion, the at least one front member being configured to connect to a front portion of the cargo box; and
        at least one rear member extending downward from a rear end of the top frame portion and configured to connect to a rear portion of the cargo box.

13. The vehicle roof accessory assembly of claim 12, wherein the accessory support structure is connected to an upright member of the cargo via at least one bracket.

\* \* \* \* \*